US012709521B2

(12) United States Patent
Okubo

(10) Patent No.: US 12,709,521 B2
(45) Date of Patent: Aug. 18, 2026

(54) ROTATION CONTROL DEVICE OF WORK MACHINE AND WORK MACHINE EQUIPPED WITH SAME

(71) Applicant: KOBELCO CONSTRUCTION MACHINERY CO., LTD., Hiroshima (JP)

(72) Inventor: Masaki Okubo, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 146 days.

(21) Appl. No.: 18/851,180

(22) PCT Filed: Jan. 27, 2023

(86) PCT No.: PCT/JP2023/002650

§ 371 (c)(1),
(2) Date: Sep. 26, 2024

(87) PCT Pub. No.: WO2023/188767

PCT Pub. Date: Oct. 5, 2023

(65) Prior Publication Data

US 2025/0214811 A1 Jul. 3, 2025

(30) Foreign Application Priority Data

Mar. 30, 2022 (JP) ................................ 2022-057159

(51) Int. Cl.
*B66C 13/44* (2006.01)
*B66C 13/16* (2006.01)
(Continued)

(52) U.S. Cl.
CPC .............. *B66C 13/44* (2013.01); *B66C 13/16* (2013.01); *B66C 13/46* (2013.01); *B66C 23/86* (2013.01)

(58) Field of Classification Search
CPC ......... B66C 13/44; B66C 13/16; B66C 13/46; B66C 13/30; B66C 23/86; E02F 9/123
See application file for complete search history.

(56) References Cited

U.S. PATENT DOCUMENTS 8,960,461 B2 * 2/2015 Kakeya .................. B66C 23/74 701/41
11,192,762 B2 * 12/2021 Kraeutler ............. B66C 23/905
(Continued)

FOREIGN PATENT DOCUMENTS

EP 3 822 221 A1 5/2021
JP 61-287697 A 12/1986
(Continued)

OTHER PUBLICATIONS

Devesse, W. Slew Control Methods for Tower Cranes—Performance comparison of different methods with a focus on optimal control, Google Scholar, Master of Science Thesis, KTH Industrial Engineering and Management Machine Design, 2012, pp. 1-84. (Year: 2012).*

(Continued)

*Primary Examiner* — Russell Frejd
(74) *Attorney, Agent, or Firm* — Oblon, McClelland, Maier & Neustadt, L.L.P.

(57) ABSTRACT

A slewing control device is used for a crane that includes an upper slewing body, a lower travelling body, a slewing drive unit, and an attachment. A controller in the slewing control device enables the slewing drive unit to operate based on feedforward control to slew the upper slewing body at a target slewing speed. The controller generates a corrected command signal by correcting a reference command signal set in advance in response to a predetermined target slewing speed, based on information about a variation factor causing (Continued)

the slewing speed to vary. The controller inputs the corrected command signal to the slewing drive unit.

15 Claims, 9 Drawing Sheets

(51) Int. Cl.
*B66C 13/46* (2006.01)
*B66C 23/86* (2006.01)

(56) References Cited

U.S. PATENT DOCUMENTS

2008/0164832 A1 7/2008 Kawaguchi et al.
2012/0298608 A1* 11/2012 Kraeutler ................ B66C 23/94 212/276
2014/0166135 A1* 6/2014 Yamashita ............ E02F 9/2296 137/565.16
2014/0190159 A1* 7/2014 Tajima ................ F15B 11/0406 60/466
2015/0012188 A1 1/2015 Scheider et al.
2015/0299987 A1* 10/2015 Ueda ....................... F15B 11/16 414/687
2021/0276838 A1 9/2021 Minami
2021/0387835 A1* 12/2021 Eto ......................... B66C 13/18
2022/0055872 A1* 2/2022 Sanada ................. F15B 11/044
2022/0411233 A1 12/2022 Minami
2024/0294365 A1* 9/2024 Sugano ................... B66C 15/00

FOREIGN PATENT DOCUMENTS

JP 8-253950 A 10/1996
JP 10-297877 A 11/1998
JP 2008-143635 A 6/2008
WO WO 2006/054582 A1 5/2006
WO WO 2021/132507 A1 7/2021

OTHER PUBLICATIONS

Weinreich, D. Slew Cranes in Shipyards, Google Scholar, Avondale Shipyards Inc, EMSCOR Inc, 1985, pp. 1-72. (Year: 1985).*
Van Vugt, T.A. Dynamic characterisation and modeling of a slew drive system of offshore cranes, Google Scholar, Thesis, Delft University of Technology, Oct. 2020, pp. 1-71. (Year: 2020).*
Extended European Search Report issued May 30, 2025 in European Patent Application No. 23778804.7, 23 pgs.
International Search Report issued on Apr. 4, 2023, in PCT/JP2023/002650 filed on Jan. 27, 2023, 2 pages.

* cited by examiner

ROTATION CONTROL DEVICE OF WORK MACHINE AND WORK MACHINE EQUIPPED WITH SAME

TECHNICAL FIELD

The present invention relates to a slewing control device for a work machine and a work machine including the slewing control device.

BACKGROUND ART

Conventionally, as a mobile crane, a crane that includes a lower travelling body, an upper slewing body, and an attachment such as a boom and a jib is known (Patent Literature 1). The attachment is attached to the front of the upper slewing body so as to be raised and lowered. When a hoist cargo is connected to a hoist cargo rope hanging down from the distal end of the attachment, the work of hoisting the hoist cargo becomes possible. In such a crane, the slewing operation of the upper slewing body may be performed with the hoist cargo being hoisted.

CITATION LIST

Patent Literature

Patent Literature 1: JP 2008-143635 A

When a command signal corresponding to a desired target slewing speed is input to a drive unit of the crane as described above to slew the upper slewing body, there are cases in which a load caused by wind and other factors is applied to the upper slewing body and actual slewing speed does not reach the target slewing speed.

SUMMARY OF INVENTION

An object of the present invention is to provide a slewing control device for a work machine, the slewing control device enabling an upper slewing body to slew at a target slewing speed with high accuracy, and a work machine including the slewing control device.

Means for Solving the Problems

A slewing control device for a work machine according to an aspect of the present invention is used for the work machine including: a lower body; an upper slewing body supported by the lower body so as to be slewable; a slewing drive unit to slew the upper slewing body through driving force according to amplitude of an input command signal; and an attachment supported by the upper slewing body so as to be pivotable in a derricking direction. The slewing control device includes a controller to enable the slewing drive unit to operate based on feedforward control to slew the upper slewing body at a predetermined target slewing speed. The controller is configured to generate a corrected command signal by correcting a reference command signal set in advance in response to the predetermined target slewing speed, based on information about a variation factor causing slewing speed to vary. The controller is configured to input the corrected command signal to the slewing drive unit.

A work machine according to another aspect of the present invention includes: a lower body; an upper slewing body supported by the lower body so as to be slewable; a slewing drive unit to slew the upper slewing body through driving force according to amplitude of an input command signal; an attachment supported by the upper slewing body so as to be pivotable in a derricking direction; and the above-described slewing control device for a work machine.

DESCRIPTION OF EMBODIMENTS

Figure 1:
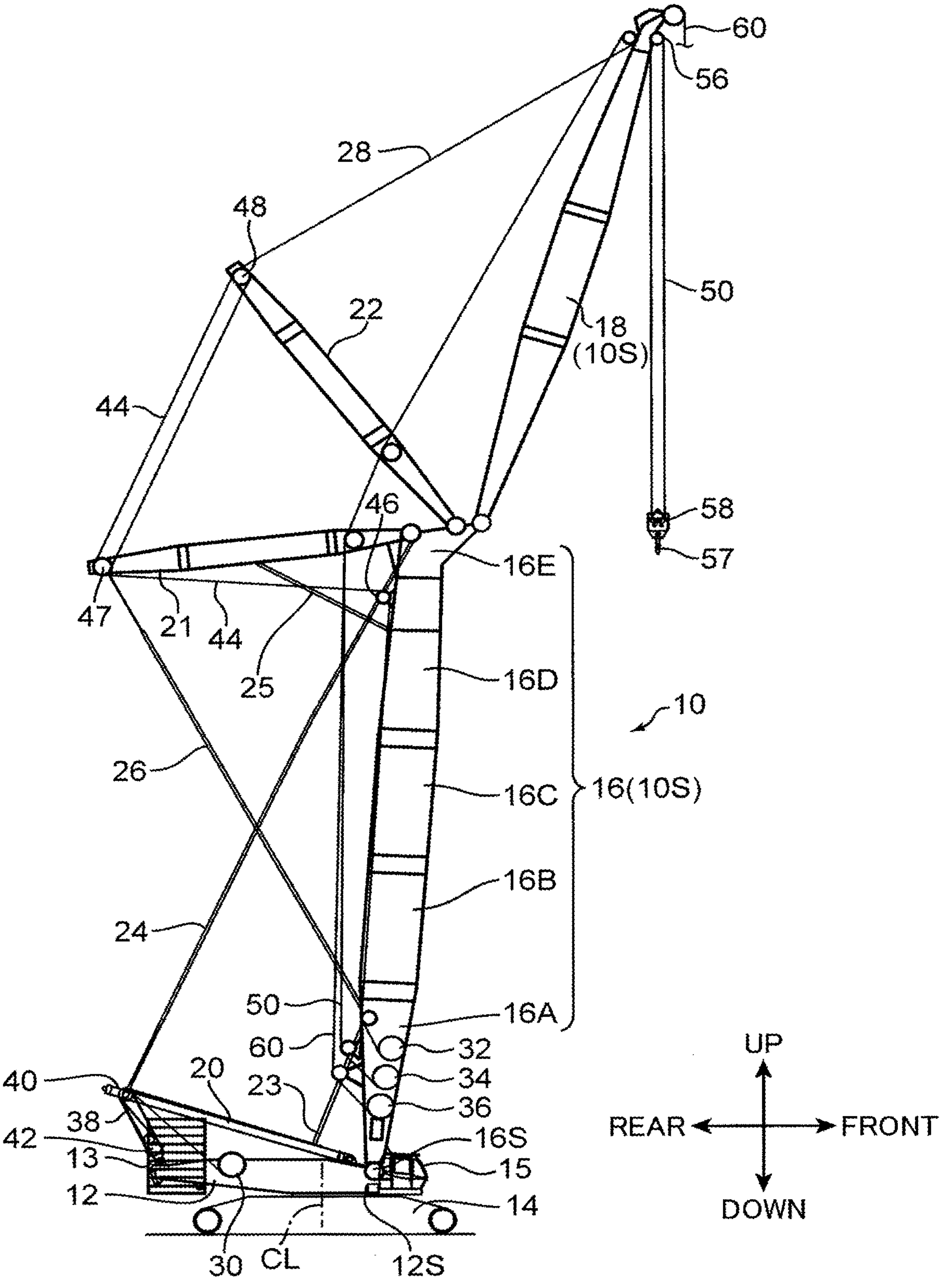
FIG. 1 is a side view of a work machine including a slewing control device according to an embodiment of the present invention.

Embodiments of the present invention will be described below with reference to the drawings. FIG. 1 is a side view of a crane 10 according to a first embodiment of the present invention. Hereinafter, each drawing includes indication of directions of “up”, “down”, “front”, and “rear”. These directions are indicated for convenience in description of a structure and an assembling method of the crane 10 according to each embodiment, and do not limit any shifting direction, any use mode, or the like of the crane according to the present invention.

The crane 10 includes an upper slewing body 12 corresponding to a crane body, a lower travelling body 14 (lower body) that slewably supports the upper slewing body 12, an attachment 10S (also referred to as a derricking part) including a boom 16 and a jib 18, and a mast 20 that is a boom derricking member. The upper slewing body 12 is supported by the lower travelling body 14 so as to be slewable about a slewing center axis CL extending in an up-and-down direction with respect to the lower travelling body 14. A slew bearing 12S (FIG. 1) is disposed between the upper slewing body 12 and the lower travelling body 14. With the slew bearing 12S sliding (rotating), the upper slewing body 12 slews. A counterweight 13 is loaded on a rear part of the upper slewing body 12 to adjust balance of the crane 10. A cab 15 is provided at a front end of the upper slewing body 12. The cab 15 corresponds to a driver’s seat of the crane 10.

The attachment 10S includes a proximal end supported by the upper slewing body 12 so as to be pivotable in a derricking direction and a distal end opposite the proximal end, and is detachable from the upper slewing body 12.

The boom 16 shown in FIG. 1 is a so-called lattice type and includes a lower boom 16A, one or more (three in the illustrative example) intermediate booms 16B, 16C, and 16D, and an upper boom 16E. The jib 18, and a rear strut 21 and a front strut 22 for pivoting the jib 18 are each pivotably coupled to a distal end of the upper boom 16E. The boom 16 is supported by the upper slewing body 12 so as to be pivotable about a rotation axis extending in a left-right direction with a boom foot pin 16S provided at a lower end as a fulcrum.

However, the specific structure of the boom is not limited in the present invention. For example, the boom may have no intermediate member, or may have a different number of intermediate members. Furthermore, the boom may include a single member.

The specific structure of the jib 18 is also not limited. A proximal end of the jib 18 is pivotably coupled to (supported by) the distal end of the upper boom 16E of the boom 16, and a pivotal axis of the jib 18 is a transverse axis parallel to a pivotal axis of the boom 16 with respect to the upper slewing body 12 (boom foot pin 16S).

The mast 20 includes a proximal end and a pivotal end, and the proximal end is pivotably coupled to the upper slewing body 12. A pivotal axis of the mast 20 is parallel to the pivotal axis of the boom 16 and is located immediately rearward of the pivotal axis of the boom 16. In other words, this mast 20 is pivotable in the same direction as the derricking direction of the boom 16. Meanwhile, the pivotal end of the mast 20 is coupled to the distal end of the boom 16 via a pair of left and right boom guy lines 24. This coupling allows the pivot of the mast 20 and the pivot of the boom 16 to cooperate with each other.

Furthermore, the crane 10 includes a pair of left and right backstops 23, a pair of left and right strut backstops 25 and guy lines 26, and a pair of left and right jib guy lines 28. The pair of left and right backstops 23 restricts the boom 16 from being tilted backward due to strong wind or the like.

The rear strut 21 is pivotably supported by the distal end of the boom 16. The rear strut 21 is held in a posture protruding from the distal end of the upper boom 16E to the boom standing side (left side in FIG. 1). As a means for holding this posture, the pair of left and right strut backstops 25 and the pair of left and right guy lines 26 are interposed.

The front strut 22 is disposed rearward of the jib 18, and is pivotably supported by the distal end of the boom 16 (upper boom 16E) so as to pivot together with the jib 18. In detail, the pair of left and right jib guy lines 28 is stretched to couple a distal end of the front strut 22 to a distal end of the jib 18. Therefore, this pivotable drive of the front strut 22 also drives the jib 18 to pivot integrally with the front strut 22.

The crane 10 further includes various winches. Specifically, the crane 10 includes a boom derricking winch 30 to raise and lower the boom 16, a jib derricking winch 32 to pivot the jib 18 in the derricking direction, and a main winding winch 34 and an auxiliary winding winch 36 to hoist and lower the hoist cargo. The crane 10 includes a boom derricking rope 38, a jib derricking rope 44, a main winding rope 50, and an auxiliary winding rope 60. Positions of the winches 30, 32, 34, and 36 are not limited to the mode in FIG. 1.

The boom derricking winch 30 winds up or unwinds the boom derricking rope 38 to change the distance between both sheave blocks 40 and 42. This causes the mast 20 and the boom 16 interlocked with the mast to pivot in the derricking direction.

The jib derricking winch 32 winds up or unwinds the jib derricking rope 44 reeved around between the rear strut 21 and the front strut 22 to change the distance between both sheave blocks 47 and 48 and pivot the front strut 22 relative to the rear strut 21. As a result, the jib derricking winch 32 raises and lowers the jib 18 interlocked with the front strut 22.

By winding up and unwinding the main winding rope 50, the main winding winch 34 hoists and lowers the hoist cargo to change the distance between sheaves 56 and 58. This hoists and lowers a main hook 57 coupled to the main winding rope 50 hanging down from the distal end of the jib 18. In this way, in the present embodiment, the main winding rope 50 (hoist cargo rope) hangs down from the distal end of the attachment 10S and is connected to the hoist cargo via the main hook 57.

Similarly, by winding up and unwinding the auxiliary winding rope 60, the auxiliary winding winch 36 hoists and lowers the hoist cargo to hoist or lower an auxiliary hook (not shown) for the hoist cargo coupled to an end of the auxiliary winding rope 60.

Figure 2:
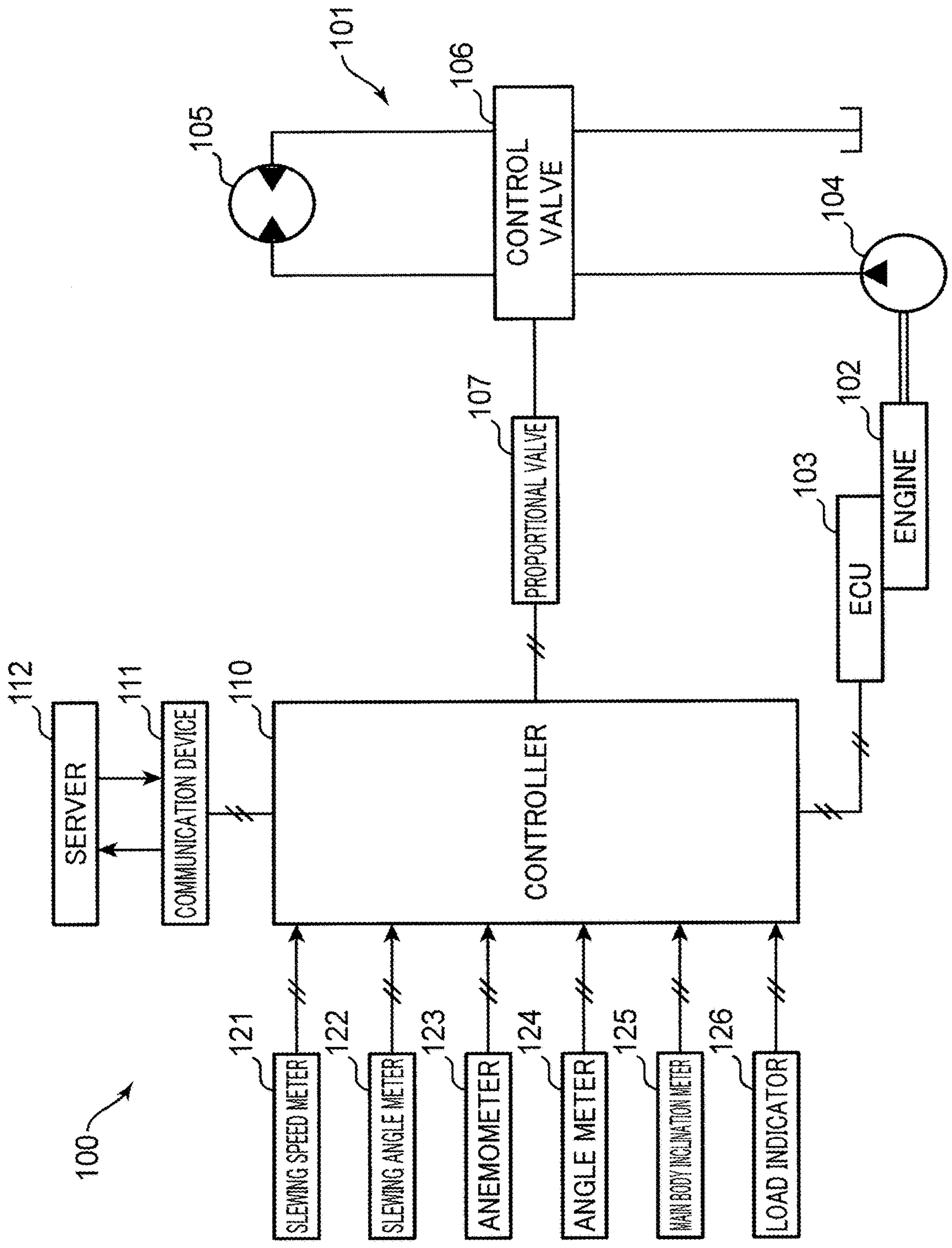
FIG. 2 is a block diagram and a hydraulic circuit diagram of a work machine according to an embodiment of the present invention.

FIG. 2 is a block diagram and a hydraulic circuit diagram of the crane 10 according to the present embodiment. The crane 10 further includes a slewing drive unit 101 and a slewing control device 100.

The slewing drive unit 101 slews the upper slewing body 12 through driving force according to amplitude of an input command signal. The slewing drive unit 101 includes an engine 102, an electronic control unit (ECU) 103, a hydraulic pump 104, a slewing motor 105, a control valve 106, and a proportional valve 107.

The engine 102 has an output shaft configured to rotate and causes the output shaft to rotate by being supplied with a fuel. Driving force generated by the engine 102 rotates the hydraulic pump 104. In response to a rotational speed switching signal from a controller 110, the ECU 103 adjusts an amount of the fuel supplied to the engine 102 to adjust rotational speed of the engine 102.

The hydraulic pump 104 discharges hydraulic oil to be supplied to the slewing motor 105. The slewing motor 105 receives hydraulic oil from the hydraulic pump 104 and generates driving force used to slew the upper slewing body 12. The slewing motor 105 has two ports and receives the hydraulic oil through one of the two ports while discharging the hydraulic oil from the other of the two ports. Depending on the destination port through which the hydraulic oil is received, the slewing motor 105 rotates to slew the upper slewing body 12 in one slewing direction (a right slewing direction) or the other slewing direction (a left slewing direction) opposite the one slewing direction.

The control valve 106 is disposed so as to be interposed between the hydraulic pump 104 and the slewing motor 105 and is configured to change a flow rate and a flow path of hydraulic oil supplied from the hydraulic pump 104 to the slewing motor 105. Specifically, when the slewing motor 105 performs a right slewing operation and a left slewing operation, the control valve 106 acts to supply the hydraulic oil from the hydraulic pump 104 to the slewing motor 105 and discharge the hydraulic oil discharged from the slewing motor 105 into a tank. The control valve 106 includes a pilot-operated three-position directional switching valve having a pair of pilot ports.

When pilot pressure is not input into any of the pair of pilot ports, the control valve 106 is maintained at a neutral position to shut off between the hydraulic pump 104 and the slewing motor 105.

When pilot pressure is input into a first pilot port, the control valve 106 switches from the neutral position to a right slewing position with a stroke corresponding to magnitude of the pilot pressure. As a result, the hydraulic oil is supplied from the hydraulic pump 104 to one oil chamber of the slewing motor 105 at a flow rate corresponding to the stroke and is discharged from another oil chamber of the slewing motor 105. This causes the slewing motor 105 to slew the upper slewing body 12 in the right slewing direction at a speed corresponding to the pilot pressure. Similarly, the description above applies to a case in which the upper slewing body 12 is slewed in the left slewing direction.

The proportional valve 107 receives a command signal input from the controller 110 and opens to input pilot pressure according to the command signal into the pilot port of the control valve 106. The proportional valve 107 is disposed so as to be interposed between a pilot pump (not shown) and the control valve 106. In FIG. 2, one piece of the proportional valve 107 is shown, but two proportional valves 107 are disposed to correspond to the pair of pilot ports. The two proportional valves 107 and the control valve 106 constitute a valve mechanism in the present invention. The valve mechanism opens so as to change the flow rate of the hydraulic oil supplied to the slewing motor 105 in response to the input command signal.

The slewing control device 100 inputs a command signal to the slewing drive unit 101 to slew the upper slewing body 12. The slewing control device 100 includes the controller 110, a communication device 111, a server 112, a slewing speed meter 121, a slewing angle meter 122, an anemometer 123, an angle meter 124, a main body inclination meter 125, and a load indicator 126 (a load detector).

The controller 110 oversees each operation of the crane 10 including the slewing operation of the upper slewing body 12. In particular, the controller 110 enables the slewing drive unit 101 to operate based on feedforward control to slew the upper slewing body 12 at a target slewing speed. A function of the controller 110 will be described later in detail.

The communication device 111 sends various types of information input from the controller 110 to the server 112 as well as receives various types of information from the server 112 and inputs such information to the controller 110.

The server 112 is disposed at a remote place different from a work site for the crane 10. The server 112 functions as a management device to control a plurality of the cranes 10. In the present embodiment, the server 112 is equipped with an advanced arithmetic processing function based on a neural network. The controller 110 may be equipped with the function of the server 112.

The slewing speed meter 121 detects a slewing speed of the upper slewing body 12 and inputs a signal corresponding to the detected speed to the controller 110.

The slewing angle meter 122 detects a slewing angle of the upper slewing body 12 with respect to the lower travelling body 14 and inputs a signal corresponding to the detected angle to the controller 110. The slewing angle is detected at 0 degree when a front-rear direction of the upper slewing body 12 coincides with a front-rear direction of the lower travelling body 14 and represents a positive value for a right slewing position and a negative value for a left slewing position in a range up to 360 degrees.

The anemometer 123 detects the direction and speed of a wind (both are wind information) surrounding the crane 10 and inputs a signal corresponding to the detected information to the controller 110.

The angle meter 124 detects a derricking angle of the boom 16 and a derricking angle of the jib 18 and inputs signals corresponding to the detected angles to the controller 110. The derricking angle of the boom 16 is an angle formed by a center line of the boom 16 relative to a horizontal plane, and the derricking angle of the jib 18 is an angle formed by a center line of the jib 18 relative to the horizontal plane. A definition of the derricking angle is not limited to this example.

The main body inclination meter 125 detects an angle of inclination of a main body of the crane 10 (the upper slewing body 12, the lower travelling body 14) with respect to the horizontal plane and inputs a signal corresponding to the detected angle to the controller 110. In a case where the crane 10 performs work, for example, on a slope, the main body inclination meter 125 detects a predetermined angle.

The load indicator 126 detects a load of the hoist cargo connected to the hook 57 suspended from the distal end of the jib 18 and inputs a signal corresponding to the detected load to the controller 110. The load indicator 126 detects the load based on tension of the rope 50, for example.

At a work site, the upper slewing body 12 of the crane 10 needs to be slewed at a desired slewing speed. In one example, with one automated operation technology for the crane 10, the slewing speed and slewing direction of the upper slewing body 12 can be controlled to suppress a cargo swing of the hoist cargo suspended from the distal end of the jib 18. The cargo swing is a phenomenon in which the hoist cargo (the rope 50) swings with the distal end of the jib 18 acting as a fulcrum. It is known that controlling the slewing operation of the upper slewing body 12 with the hoist cargo being in a state of swinging works to reduce an amount of the swing.

Figure 3:
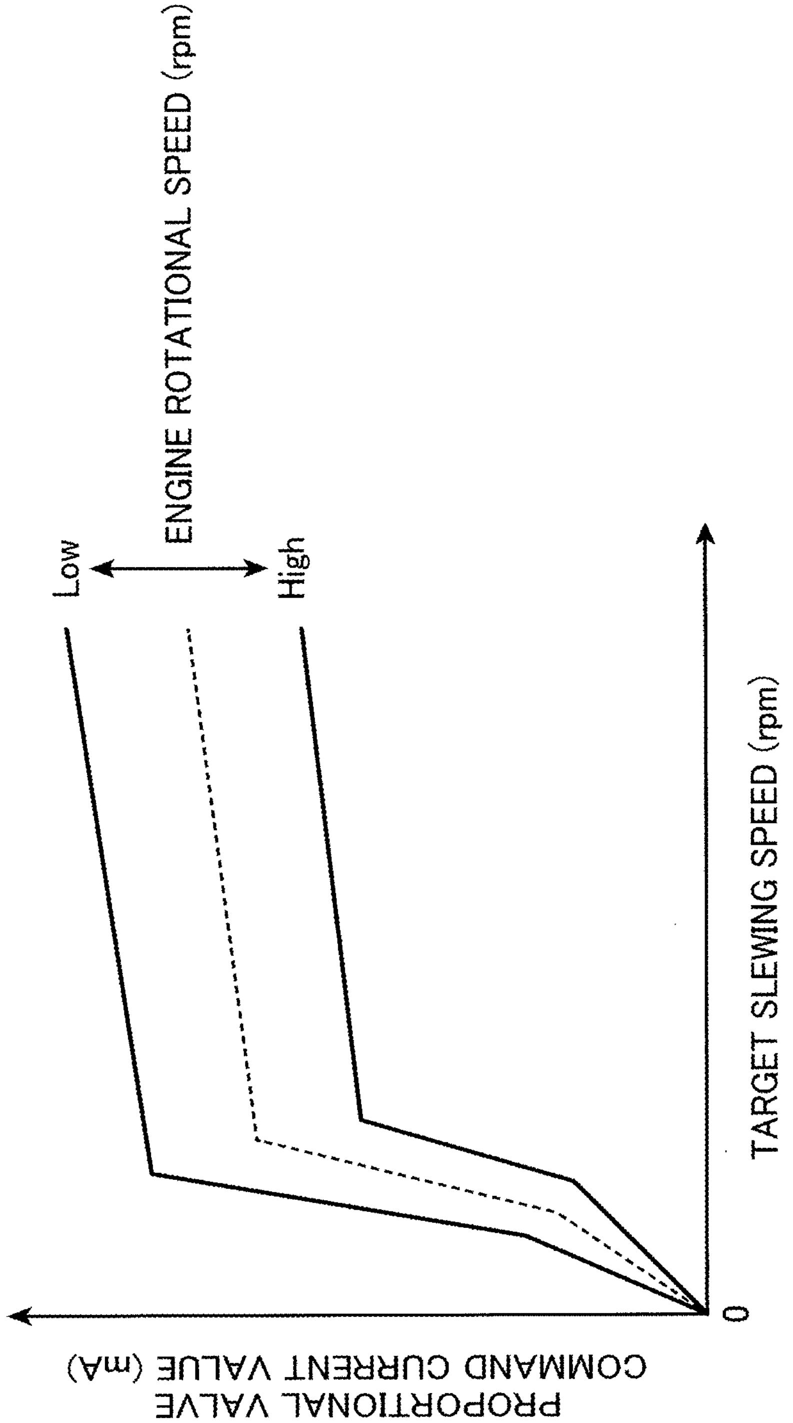
FIG. 3 is a graph illustrating a relationship between a target slewing speed and a proportional valve command current value.

FIG. 3 is a graph illustrating a relationship between a target slewing speed and a proportional valve command current value. A speed map as shown in FIG. 3 can be used to control the slewing speed described above. A speed map of this sort may be acquired by calculating hydraulic power. A level of the proportional valve command current value input from the controller 110 to the proportional valve 107 is controlled according to the speed map of this sort to adjust the flow rate of the hydraulic oil supplied from the hydraulic pump 104 to the slewing motor 105 and control the slewing speed of the upper slewing body 12. In this case, a higher rotational speed of the engine 102 makes it possible to reach the target slewing speed at a relatively lower level of the proportional current value.

An attempt made by the inventor of the present invention to control the slewing operation of the upper slewing body 12 according to a speed map set in advance results in varied actual slewing speeds due to various variation factors. In view of this, the inventor has come up with the present invention. Table 1 shows an example of such variation factors.

TABLE 1

| | Influencing Factor | Machine-side Related Parameter |
|---|---|---|
| Internal Factor | Friction | Individual differences among slew bearings and speed reducers |
| | Valve spring variations | Individual differences among valve springs |
| | Proportional valve variations | Individual differences among proportional valves |

TABLE 1-continued

| | Influencing Factor | Machine-side Related Parameter |
|---|---|---|
| External Factor | Wind load | Attachment configuration, boom angle, and jib angle |
| | Main body inclination | Attachment configuration, boom angle, jib angle, and hoist cargo load |

Factors causing the slewing speed of the upper slewing body 12 to vary are classified into internal factors (internal variation factors) and external factors (external variation factors). The internal factors are mainly related to the crane 10, and if a plurality of the cranes 10 exist, these factors indicate different degrees of causality among the cranes 10. Specifically, influencing factors included in the internal factors are friction, valve spring variations, and proportional valve variations, for example. The friction is equivalent to individual differences among the slew bearings 12S (FIG. 1) and speed reducers associated with the slew bearings. The valve spring variations are equivalent to individual differences among spring constants of pairs of springs disposed corresponding to the pairs of pilot ports of the control valves 106. If the spring constants differ, opening areas of the control valves 106 vary even with the same proportional valve command current value. As a result, the slewing speed of the upper slewing body 12 varies. The proportional valve variations are individual differences among the proportional valves 107. This means that, even in response to the same proportional valve command current value, the pilot pressure supplied to the pilot port of the control valve 106 differs among the individual proportional valves 107.

Meanwhile, influencing factors included in the external factors are a wind load (wind information) and main body inclination, for example. The wind load represents a load that is formed by resistance to the slewing operation of the upper slewing body 12 when a wind generated at the work site acts on the attachment 10S. A larger volume of the wind causes higher resistance to the attachment 10S. A level of the resistance also changes depending on a direction of the wind against the slewing operation of the upper slewing body 12, i.e., the attachment 10S. Further, magnitude of the wind load changes by wind receiving area and thus changes depending on a configuration of the attachment 10S (only the boom 16 or both the boom 16 and the jib 18), an angle of the boom 16, and an angle of the jib 18. The main body inclination is equivalent to an inclination of the main body of the crane 10 (the upper slewing body 12, the lower travelling body 14) at the work site. When the crane 10 performs work on a predetermined inclined surface, the slewing center axis of the upper slewing body 12 is inclined with respect to a vertical direction. Hence, gravity acting on the attachment 10S works to facilitate or hinder the slewing operation in response to a slewing position (the slewing angle) of the upper slewing body 12. This constitutes a factor responsible for slewing speed variations. Machine-side related parameters pertinent to the main body inclination include the load of the hoist cargo influencing centrifugal force of the attachment 10S in addition to the configuration of the attachment 10S, the angle of the boom 16, and the angle of the jib 18.

Figure 4:
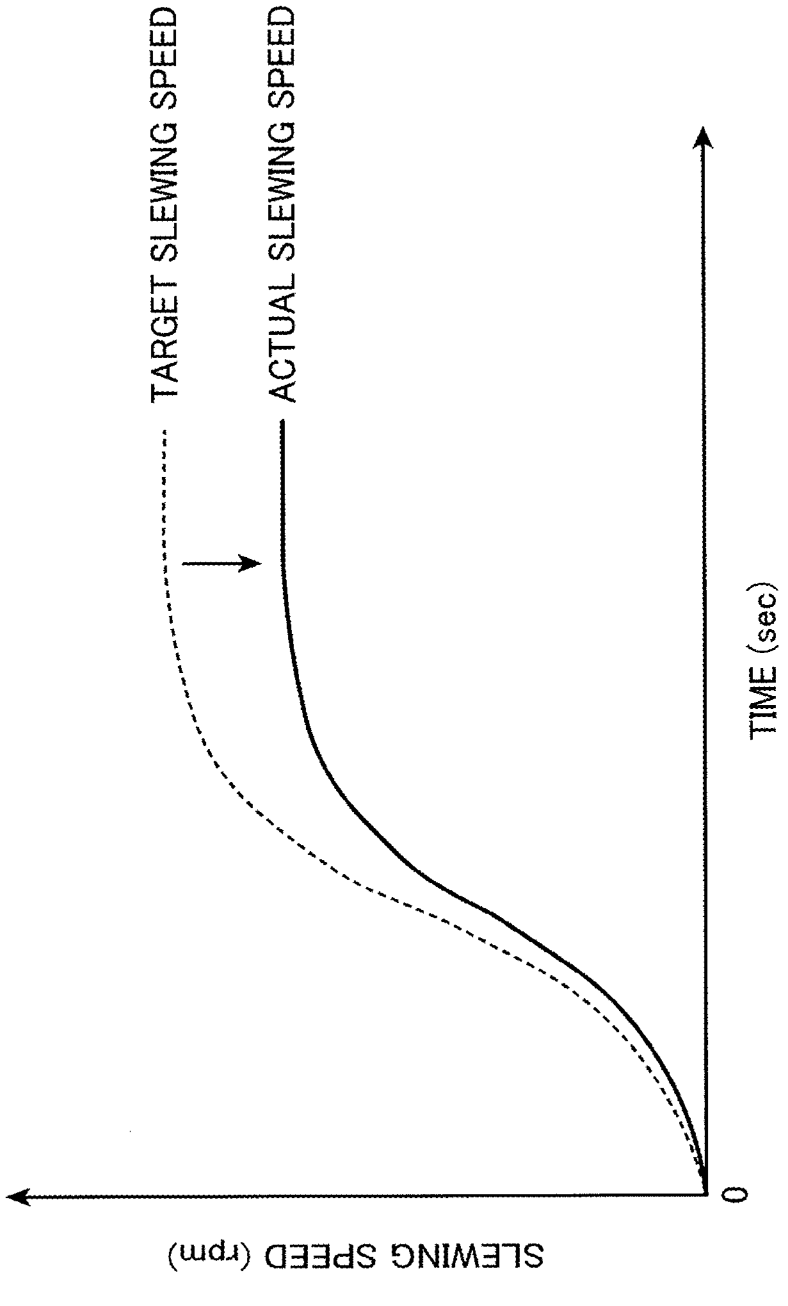
FIG. 4 is a graph illustrating changes in target slewing speed and actual slewing speed over time.

As described above, various factors exist to cause variations in the slewing speed of the upper slewing body 12. Thus, an attempt to control the slewing speed according to the speed map set in advance as in FIG. 3 irrespective of individual differences among the cranes 10 and the work site environment does not make it possible to reach the target slewing speed. FIG. 4 is a graph illustrating changes in target slewing speed and actual slewing speed over time. As shown in FIG. 4, when a proportional valve command current value is input according to the speed map of FIG. 3, resistance and a load due to the variation factors cause the actual slewing speed to be lower than the target slewing speed. This, when the slewing speed of the upper slewing body 12 is controlled to control a cargo swing, results in a problem such as the cargo swing being not suppressed or being facilitated, for example.

In the present embodiment, to solve the problem described above, the controller 110 of the slewing control device 100 suitably controls the proportional valve command current value input into the proportional valve 107. Specifically, the controller 110 generates a corrected command signal by correcting a reference command signal set in advance in response to a predetermined target slewing speed, based on information about variation factors causing the slewing speed to vary. The controller inputs the corrected command signal to the slewing drive unit 101.

In particular, in the present embodiment, the controller 110 adjusts the slewing speed of the upper slewing body 12 based on the following Equation 1.

$$I\_swing = I\_ideal + I\_mod\_in + I\_mod\_ext \qquad \text{(Equation 1)}$$

In Equation 1, I_swing represents a proportional valve command current value (a corrected command signal) that is finally input to the proportional valve 107. I_ideal represents a theoretical value on the speed map and a command current value acquired from an ideal relationship. I_mod_in is a term for correcting the internal factors, while I_mod_ext is a term for correcting the external factors described above.

Figure 5:
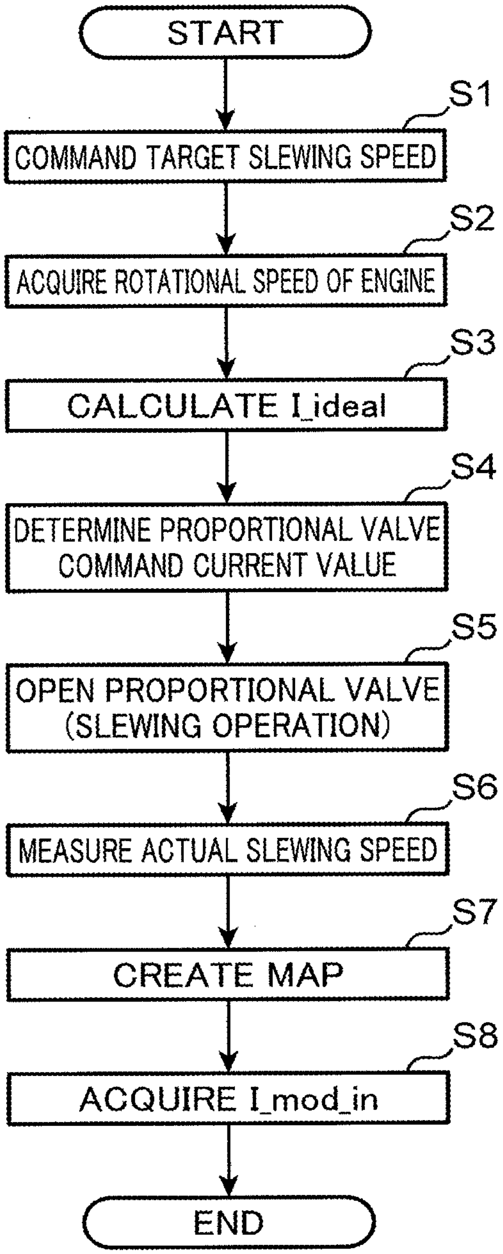
FIG. 5 is a flowchart illustrating control executed by a slewing control device according to an embodiment of the present invention to correct an internal variation factor.
Figure 6:
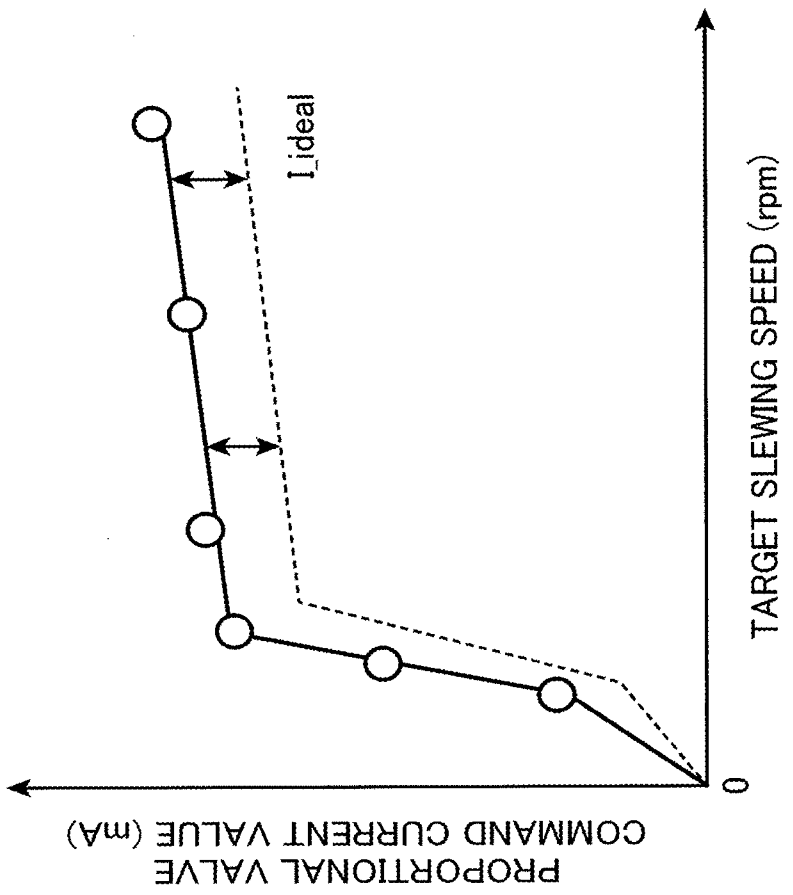
FIG. 6 is a graph illustrating a relationship between a target slewing speed and a proportional valve command current value.
Figure 7:
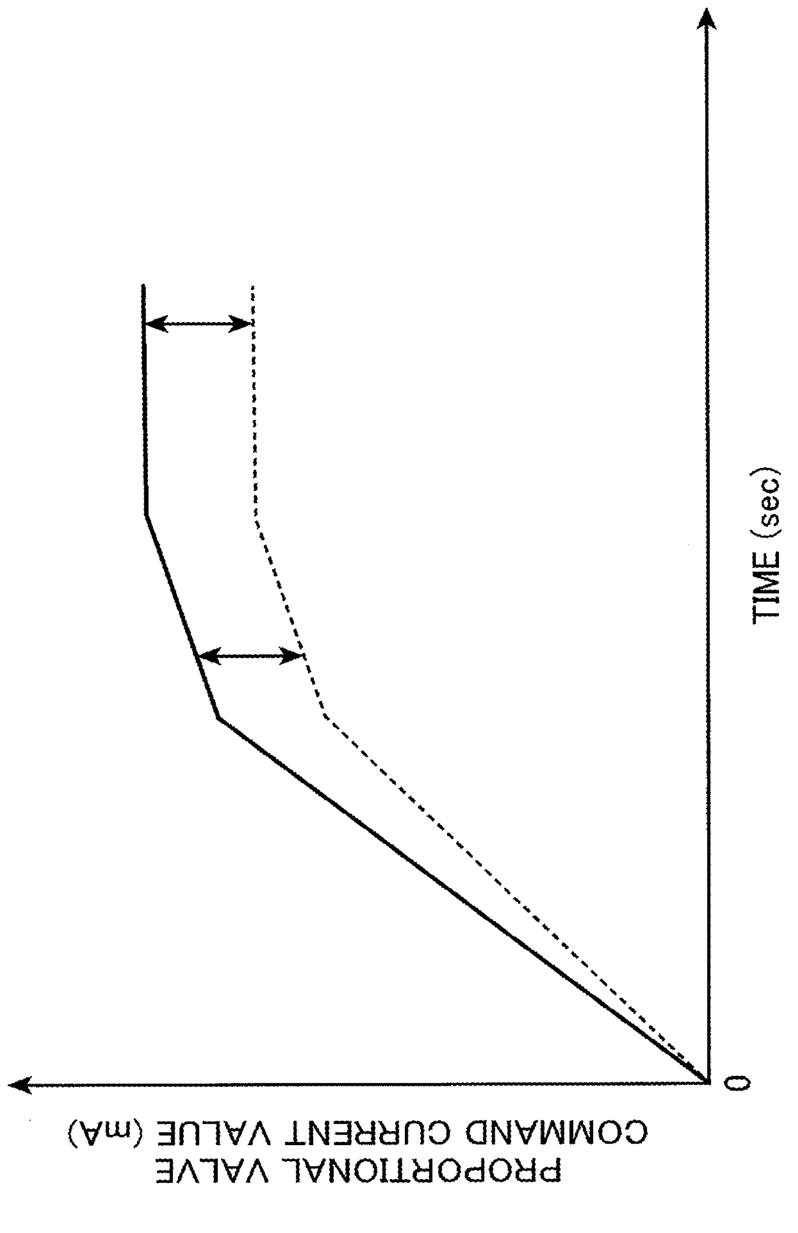
FIG. 7 is a graph illustrating changes in proportional valve command current value over time.

Next, a procedure for deducing the I_mod_in term above in the present embodiment will be described. FIG. 5 is a flowchart illustrating control executed by the slewing control device 100 according to the present embodiment to correct an internal factor. FIG. 6 is a graph illustrating a relationship between a target slewing speed and a proportional valve command current value. FIG. 7 is a graph illustrating changes in proportional valve command current value over time.

In one example, in the present embodiment, with the attachment 10S removed from the upper slewing body 12, the I_mod_in term above is deduced, set, and stored in the controller 110 before the crane 10 is shipped from a factory. In other words, I_mod_in is set for each of the individual cranes 10 in consideration of individual differences among the cranes 10. As shown in FIG. 5, in a process for deducing I_mod_in, the controller 110 commands a predetermined target slewing speed (step S1). Next, the controller 110 acquires information about rotational speed of the engine 102 from the ECU 103 (step S2). An operator sets the rotational speed of the engine 102 through a rotational speed setting switch disposed inside a cab of the crane 10. Next, the controller 110 calculates I_ideal (step S3). In one example, the speed map shown in FIG. 3 is stored in the controller 110 in advance, and the controller 110 calculates I_ideal from the target slewing speed and the rotational speed of the engine according to the speed map. If information on the graph shown in FIG. 3 is stored in the controller 110, a vertical axis of the graph is equivalent to I_ideal. I_ideal may be calculated based on an arithmetic expression representing the graph stored in the controller 110. As a result, a proportional valve command current value input to the proportional valve 107 is determined (step S4).

Next, the controller 110 inputs the proportional valve command current value to the proportional valve 107 to open the proportional valve 107 and cause the slewing motor 105 to rotate (step S5). As a result, the upper slewing body 12 to which the attachment 10S is not attached slews with respect to the lower travelling body 14. The slewing speed meter 121 measures an actual slewing speed of the upper slewing body 12 and inputs a result of the measured speed to the controller 110 (step S6). The controller 110, which receives the actual slewing speed, creates a map showing a relationship between the received actual slewing speed and the proportional valve command current value determined in step S4 and stores the map (step S7). In FIG. 6, I_ideal acquired in step S3 is indicated by a broken line, and the actual slewing speed mapped in step S7 is indicated by a solid line. In other words, even if the attachment 10S is removed from the upper slewing body 12, the crane requires a higher level of the current value than the ideal proportional valve command current value, I_ideal, due to the internal factors such as friction, valve spring variations, and proportional valve variations. In FIG. 6, a difference between the solid line and the broken line with respect to a common target slewing speed is equivalent to I_mod_in. This enables the controller 110 to acquire information about I_mod_in (step S8).

With I_mod_in acquired, I_swing', a proportional valve correction current value that factors in the internal factors, is set based on the following Equation 2.

$$I\_swing' = I\_ideal + I\_mod\_in \quad \text{(Equation 2)}$$

In other words, if the upper slewing body 12 is required to slew at a predetermined target slewing speed, I_swing' instead of I_ideal is input to the proportional valve 107 to attain a highly accurate slewing speed with variations caused by the internal factors being reduced. In FIG. 7, I_ideal is indicated by a broken line, and I_swing' is indicated by a solid line.

It is preferable to perform the procedure in FIG. 5 repeatedly with the rotational speed of the engine and the target slewing speed being varied. This enables I_mod_in to be acquired with high accuracy even if these parameters vary.

Figure 8:
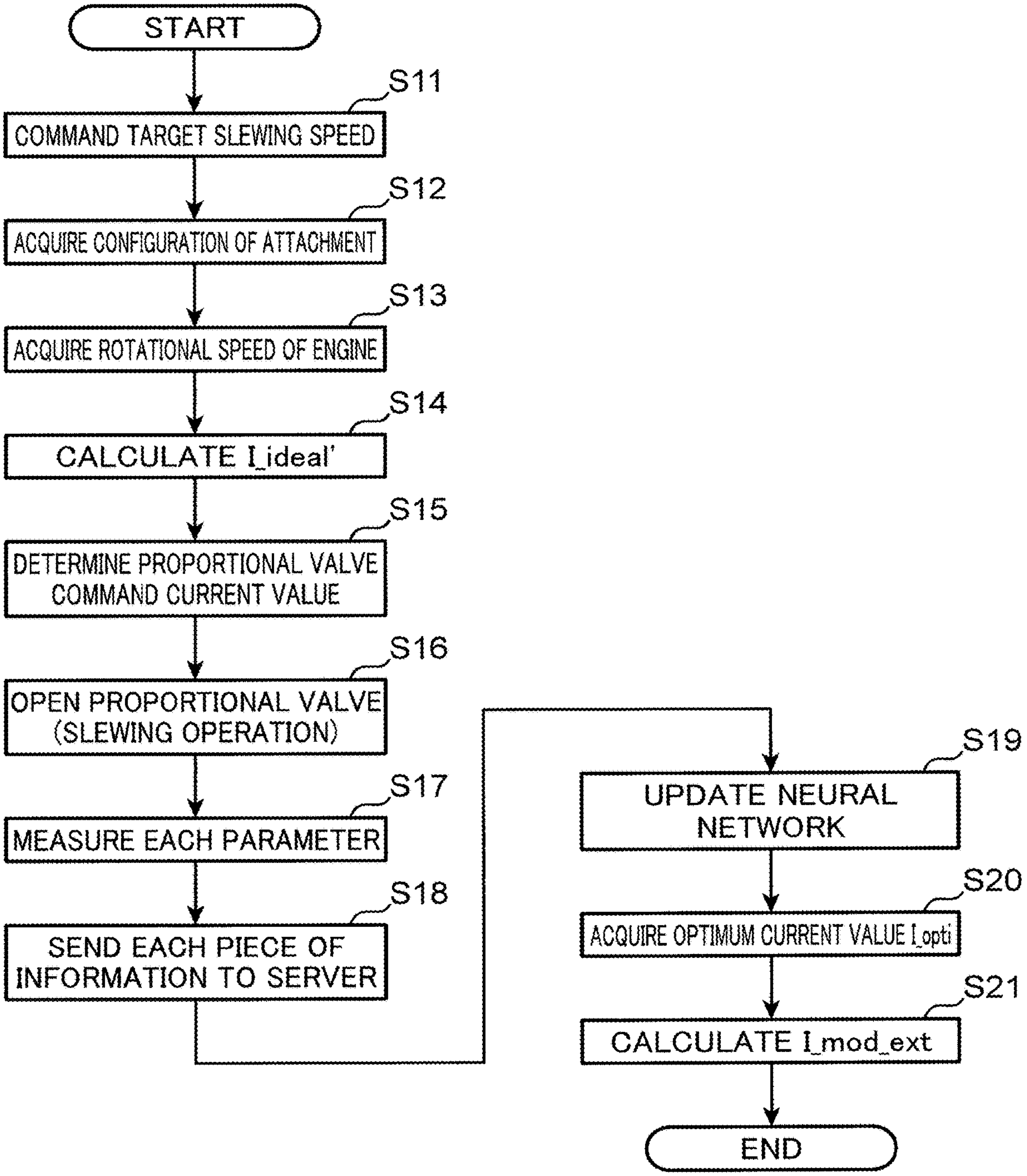
FIG. 8 is a flowchart illustrating control executed by a slewing control device according to an embodiment of the present invention to correct an external variation factor.

Next, a procedure for deducing the I_mod_ext term above in the present embodiment will be described. FIG. 8 is a flowchart illustrating control executed by the slewing control device 100 according to the present embodiment to correct an external factor. In one example, in the present embodiment, with the attachment 10S attached to the upper slewing body 12, the I_mod_ext term above is deduced, set, and stored in the controller 110 at a work site for the crane 10. After the I_mod_in term above is deduced and set, and before the crane is shipped from the factory, an initial value of I_mod_ext may be set by a procedure similar to the following.

As shown in FIG. 8, in a similar way, in a process for deducing I_mod_ext, the controller 110 commands a predetermined target slewing speed (step S11). Next, the controller 110 acquires information about the configuration of the attachment 10S stored in advance in a storage unit in the controller 110 (step S12). Further, the controller 110 acquires information about rotational speed of the engine 102 from the ECU 103 (step S13). Next, the controller 110 calculates I_ideal' (step S14). In one example, the speed map indicated by the solid line in FIG. 6 is stored in the controller 110 in advance, the speed map factoring in the internal factors. The controller 110 calculates I_ideal' from the target slewing speed and the rotational speed of the engine according to the speed map. As a result, a proportional valve command current value input to the proportional valve 107 is determined (step S15).

Next, the controller 110 inputs the proportional valve command current value to the proportional valve 107 to open the proportional valve 107 and cause the slewing motor 105 to rotate (step S16). As a result, the upper slewing body 12 to which the attachment 10S is attached slews with respect to the lower travelling body 14. Then, in step S17, each of parameters is measured. Specifically, the slewing speed meter 121 measures an actual slewing speed of the upper slewing body 12 and inputs a result of the measured speed to the controller 110. Similarly, pieces of information detected by the slewing angle meter 122, the anemometer 123, the angle meter 124, the main body inclination meter 125, and the load indicator 126 are input to the controller 110.

Here, the controller 110 sends pieces of information including the target slewing speed in step S11, the attachment configuration in step S12, and the actual slewing speed, the direction and speed of the wind, the angles of the boom 16 and the jib 18, the inclination of the main body of the crane 10, and the hoist cargo load, which are acquired in step S17, via the communication device 111 (FIG. 2) to the server 112 (step S18).

The server 112, which acquires the pieces of information, updates the neural network with the acquired pieces of information as input values (step S19). Here, the neural network calculates an interrelationship among the input parameters above and stores information about the proportional valve command current value used to reach the target slewing speed when the parameters vary. Hence, the server can output I_opti, an optimum command current value that enables acquisition of the target slewing speed, which is set in step S11 in FIG. 8, with highest accuracy. The controller 110 acquires the optimum command current value I_opti input to the communication device 111 from the server 112 (step S20).

The controller 110 can calculate latest I_mod_ext by subtracting I_ideal' calculated in step S14 from the optimum command current value I_opti (step S21). In other words, the optimum command current value I_opti includes the I_ideal command current value acquired from an ideal relationship, the I_mod_in term for correcting the internal factors, and the I_mod_ext term for correcting the external factors, and thus makes it possible to acquire I_mod_ext by removing an amount of I_ideal' equivalent to I_ideal+I_mod_in.

It is also preferable to perform the procedure shown in FIG. 8 repeatedly with pieces of information including the direction and speed of the wind, the angles of the boom 16 and the jib 18, the inclination of the main body of the crane 10, and the hoist cargo load, as well as the rotational speed of the engine and the target slewing speed being varied. These pieces of work may be conducted at a place such as the factory before the crane is shipped. This enables I_mod_ext to be acquired with high accuracy even if these parameters vary. As a result, even if the parameters vary at the work site, the controller can input the I_swing proportional valve command current value, which enables the upper slewing body 12 to slew at the target slewing speed, to the proportional valve 107. A mode may be adopted where the I_swing proportional valve command current value is set in response to at least one variation factor included in the internal factors and the external factors.

It is possible for the server 112 to acquire the parameters from a plurality of the cranes 10 that are operational at the work site, and information on I_mod_ext may be stored in the server 112 and be shared. In particular, the cranes 10 of the same class (or built to shared specifications) may use common I_mod_ext.

Figure 9:
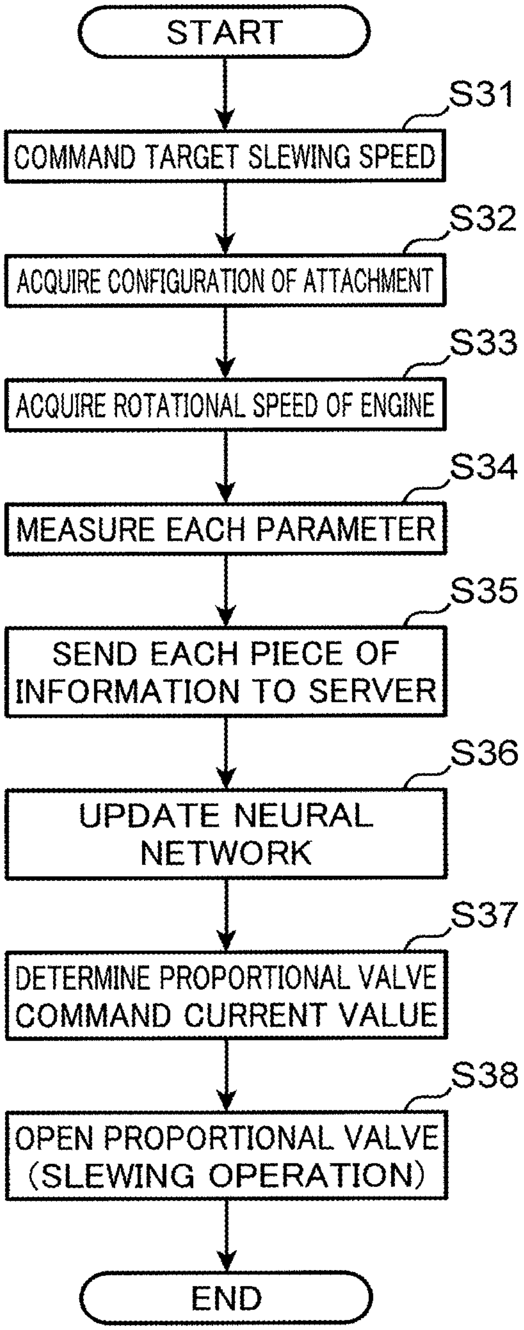
FIG. 9 is a flowchart illustrating control executed by a slewing control device according to a modified embodiment of the present invention to correct an external variation factor.

The above embodiment has been described in a mode in which the I_mod_ext term for correcting the external factors is set before the crane 10 starts working at the work site. However, the present invention is not limited to this example. FIG. 9 is a flowchart illustrating control executed by the slewing control device 100 according to a modified embodiment of the present invention to correct an external factor. In the present modified embodiment, predetermined information is stored by the neural network of the server 112 in advance, and I_swing, an appropriate proportional valve command current value, is set in response to each of parameters acquired after the crane 10 starts working at the work site.

The controller 110 commands a predetermined target slewing speed, for example, based on feedforward control to suppress a cargo swing of the hoist cargo (step S31). Next, the controller 110 acquires information about the configuration of the attachment 10S (step S32). Further, the controller 110 acquires information about rotational speed of the engine 102 from the ECU 103 (step S33).

Next, in step S34, each of parameters is measured. Specifically, information detected by the slewing angle meter 122, the anemometer 123, the angle meter 124, the main body inclination meter 125, and the load indicator 126 is input to the controller 110. The controller 110, which acquires such information, sends the acquired information to the server 112 (step S35). The server 112, which receives the information, updates the neural network with the received information as an input value (step S36), determines I_swing, an optimum proportional valve command current value corresponding to the target slewing speed set in step S31, (step S37), and sends the determined value to the controller 110 via the communication device 111. The controller 110, based on the I_swing proportional valve command current value, opens the proportional valve 107 and executes the slewing operation of the upper slewing body 12 (step S38). At this time, the actual slewing speed of the upper slewing body 12 detected by the slewing speed meter 121 may be sent from the controller 110 to the server 112 to cause the neural network in the server 112 to update (learn) information.

As described above, in the present modified embodiment, the slewing control device can both control the slewing speed of the upper slewing body 12 with high accuracy and update information inside the server 112, while the crane 10 is working at the work site. A method of the calculation performed by the server 112 is not limited to the neural network, but may be based on, for example, another known machine-learning function.

According to each of the embodiments above, the slewing control device 100 (the controller 110) enables the slewing drive unit 101 to operate based on feedforward control to slew the upper slewing body 12 at a target slewing speed. The controller 110 generates a corrected command signal by correcting a reference command signal set in advance in response to a predetermined target slewing speed, based on information about variation factors causing the slewing speed to vary. The controller inputs the corrected command signal to the slewing drive unit 101. Hence, the slewing control device enables the upper slewing body 12 to slew at the target slewing speed with high accuracy while reducing variations caused by the variation factors.

In particular, the variation factors include external variation factors related to the work site for the crane 10. Thus, the slewing control device enables the upper slewing body 12 to slew at the target slewing speed with high accuracy even if the external variation factors causing the slewing speed to vary change at the work site.

The slewing control device 100 may include the anemometer 123 (a wind information acquisition unit), and the controller 110 may generate a corrected command signal by correcting the reference command signal based on wind information including at least one of a volume of the wind and a direction of the wind as an external variation factor. According to such a configuration, even if the wind information changes at the work site, the slewing control device enables the upper slewing body 12 to slew at the target slewing speed with high accuracy.

When the slewing control device 100 further includes the slewing angle meter 122 (a slewing angle detector) configured to detect a slewing angle of the upper slewing body 12 with respect to the lower travelling body 14 in addition to the anemometer 123, the controller 110 may generate a corrected command signal by correcting the reference command signal based on the direction of the wind and the slewing angle as an external variation factor. According to such a configuration, the slewing control device enables the upper slewing body 12 to slew at the target slewing speed with high accuracy, factoring in a load that the attachment 10S supported by the upper slewing body 12 receives from the wind, a degree of the load depending on a direction, from windward to leeward or from leeward to windward, in which the attachment 10S moves.

The angle meter 124 in FIG. 2 can function as a working radius acquisition unit of the present invention. In other words, if information on lengths of the boom 16 and the jib 18 is stored in the controller 110 in advance, the controller 110 can calculate a working radius of the attachment 10S in plan view from the derricking angle of the boom 16 and the derricking angle of the jib 18 detected by the angle meter 124. In this case, the controller 110 may generate a corrected command signal by correcting the reference command signal based on the wind information and the working radius as an external factor.

In a case of a small working radius of the attachment 10S, in other words, when an attitude of the attachment 10S with respect to the upper slewing body 12 is closer to a vertical direction, momentum the attachment 10S receives from the wind in a lateral direction is small. On the other hand, in a case of a large working radius of the attachment 10S, in other words, when the attitude of the attachment 10S is substantially tilted to the upper slewing body 12, the momentum the attachment 10S receives from the wind in the lateral direction is relatively large. Thus, since the controller 110 factors in the working radius of the attachment 10S and generates a corrected command signal by factoring in the momentum the attachment 10S receives from the wind in the lateral direction (a lateral direction of the upper slewing body 12), the slewing control device enables the upper slewing body 12 to slew at the target slewing speed with high accuracy.

When the controller 110 includes the main body inclination meter 125 (an inclination detector), the controller 110 may generate a corrected command signal by correcting the reference command signal based on an angle of inclination of the upper slewing body 12 with respect to the horizontal plane as an external factor. According to such a configuration, the slewing control device enables the upper slewing body 12 to slew at the target slewing speed with high accuracy, factoring in an effect of gravity that the attachment 10S supported by the upper slewing body 12 receives in response to an inclination of the work site.

When the controller 110 includes the slewing angle meter 122 in addition to the main body inclination meter 125 (the inclination detector), the controller 110 may generate a corrected command signal by correcting the reference command signal based on the angle of inclination of the upper slewing body 12 with respect to the horizontal plane and the slewing angle of the upper slewing body 12 as an external factor. According to such a configuration, the slewing control device enables the upper slewing body 12 to slew at the target slewing speed with high accuracy since the controller generates a corrected command signal, factoring in the effect of gravity that the attachment 10S supported by the upper slewing body 12 receives, the effect of gravity depending on a direction in which the attachment 10S moves up or down along an inclined surface.

When the controller 110 includes the main body inclination meter 125 and is configured to calculate the working radius as described above and acquire information concerning the working radius, the controller 110 may generate a corrected command signal by correcting the reference command signal based on the angle of the inclination and the working radius described above as an external factor. According to such a configuration, the slewing control device enables the upper slewing body 12 to slew at the target slewing speed with high accuracy since the controller generates a corrected command signal, factoring in the effect of gravity received in response to the inclination of the work site and consequent momentum the attachment 10S actually receives in the lateral direction.

Further, when the controller 110 includes the load indicator 126, the controller 110 may generate a corrected command signal by correcting the reference command signal based on the hoist cargo load as an external factor. According to such a configuration, the slewing control device enables the upper slewing body 12 to slew at the target slewing speed with high accuracy since the controller generates a corrected command signal, factoring in a load applied by the hoist cargo load to the slewing operation of the upper slewing body 12.

The variation factors may include internal factors related to the crane 10. In such a case, even if the internal factors change at the work site, the slewing control device enables the upper slewing body 12 to slew at the target slewing speed with high accuracy.

In particular, in the present embodiment, the internal factors include factors causing the slewing speed of the upper slewing body 12 in a non-connection state to vary. The non-connection state is a state in which the attachment 10S is detached from the upper slewing body 12. According to such a configuration, the slewing control device enables the upper slewing body 12 to which the attachment 10S is attached to slew at the target slewing speed with high accuracy, factoring in variation factors presented when the upper slewing body 12 without the attachment 10S slews with respect to the lower travelling body 14. In other words, the slewing control device is configured to set the slewing speed of the upper slewing body 12 at the target slewing speed, factoring in degrees of tolerance of and individual differences among the slew bearings 12S (FIG. 1) and speed reducers coupled to the slew bearings, and other factors presented when the upper slewing body 12 to which the attachment 10S is not attached slews with respect to the lower travelling body 14.

Further, in the present embodiment, the slewing drive unit 101 includes the slewing motor 105 and the valve mechanism (the control valve 106, the proportional valves 107) that opens so as to change the flow rate of the hydraulic oil supplied to the slewing motor 105 in response to the input command signal. Hence, with the controller 110 optimizing the command signal (the proportional valve command current value) input to the valve mechanism, the slewing control device is configured to stably set the slewing speed of the upper slewing body 12 at the target slewing speed.

In the present embodiment, the controller 110 (the server 112) receives information about the variation factors and corrects I_ideal (the reference command signal) through the neural network. This makes it possible to acquire an optimum command signal after correction, factoring in the effect of each parameter, even under conditions in which a plurality of parameters vary and advanced calculation is necessary.

The slewing control device 100 according to each of the embodiments of the present invention and the crane 10 including the same slewing control device have been described above. Note that the present invention is not limited to these embodiments. The present invention can adopt the following modified embodiments, for example.

(1) In the embodiments described above, the controller 110 in a mode sets the command signal input to the proportional valve 107 in consideration of both the internal factors and the external factors in Table 1. However, the present invention is not limited to this example. The controller 110 may set the command signal based on either the internal or external variation factors. The variation factors are not limited to those shown in Table 1.

(2) The crane 10 shown in FIG. 1 may not include the rear strut 21 and the front strut 22, or may include one strut. The mast structure that supports the boom 16 is also not limited to the structure shown in FIG. 1, and may be another mast structure or a gantry structure (not shown). Further, the crane 10 may not include the jib 18. Further, the lower body supporting the upper slewing body 12 is not limited to the lower travelling body 14 capable of travelling, but may be a fixed body. The work machine according to the present invention is not limited to the crane 10, but may be another work machine including an upper slewing body that slews with respect to a lower body.

A slewing control device for a work machine according to an aspect of the present invention is used for the work machine including: a lower body; an upper slewing body supported by the lower body so as to be slewable; a slewing drive unit to slew the upper slewing body through driving force according to amplitude of an input command signal; and an attachment supported by the upper slewing body so as to be pivotable in a derricking direction. The slewing control device includes a controller to enable the slewing drive unit to operate based on feedforward control to slew the upper slewing body at a predetermined target slewing speed, the controller being configured to generate a corrected command signal by correcting a reference command signal set in advance in response to the predetermined target slewing speed, based on information about a variation factor causing slewing speed to vary, the controller being configured to input the corrected command signal to the slewing drive unit.

According to this configuration, the controller corrects the reference command signal, factoring in the variation factor. Hence, the slewing control device enables the upper slewing body to slew at the target slewing speed with high accuracy while reducing variations caused by the variation factor.

In the configuration above, the variation factor may include an external variation factor related to a work site for the work machine.

According to this configuration, the slewing control device enables the upper slewing body to slew at the target slewing speed with high accuracy even if the external variation factor causing the slewing speed to vary changes at the work site.

In the configuration above, the slewing control device may further include a wind information acquisition unit configured to acquire wind information including at least one of a volume of a wind and a direction of the wind at the work site, in which the external variation factor may include the wind information.

According to this configuration, even if the wind information changes at the work site, the slewing control device enables the upper slewing body to slew at the target slewing speed with high accuracy.

In the configuration above, the slewing control device may further include a slewing angle detector configured to detect a slewing angle of the upper slewing body with respect to the lower body, in which the wind information may include the direction of the wind, and the controller may correct the reference command signal based on at least the direction of the wind and the slewing angle.

According to this configuration, the slewing control device enables the upper slewing body to slew at the target slewing speed with high accuracy, factoring in a load that the attachment supported by the upper slewing body receives from the wind, a degree of the load depending on a direction, from windward to leeward or from leeward to windward, in which the attachment moves.

In the configuration above, the slewing control device may further include a working radius acquisition unit configured to acquire information about a working radius of the attachment, in which the controller may correct the reference command signal based on at least the wind information and the working radius.

According to this configuration, since the controller factors in the working radius of the attachment and thereby factors in the momentum the attachment receives from the wind in the lateral direction (a lateral direction of the upper slewing body), the slewing control device enables the upper slewing body to slew at the target slewing speed with high accuracy.

In the configuration above, the slewing control device may further include an inclination detector configured to detect an angle of inclination of the upper slewing body at the work site with respect to a horizontal plane, in which the external variation factor may include the angle of the inclination.

According to this configuration, the slewing control device enables the upper slewing body to slew at the target slewing speed with high accuracy, factoring in an effect of gravity that the attachment supported by the upper slewing body receives in response to an inclination of the work site.

In the configuration above, the slewing control device may further include a slewing angle detector configured to detect a slewing angle of the upper slewing body with respect to the lower body, in which the controller may correct the reference command signal based on at least the angle of the inclination and the slewing angle.

According to this configuration, the slewing control device enables the upper slewing body to slew at the target slewing speed with high accuracy, factoring in the effect of gravity that the attachment supported by the upper slewing body receives, the effect of gravity depending on a direction in which the attachment moves up or down along an inclined surface.

In the configuration above, the slewing control device may further include a working radius acquisition unit configured to acquire information about a working radius of the attachment, in which the controller may correct the reference command signal based on at least the angle of the inclination and the working radius.

According to this configuration, the slewing control device enables the upper slewing body to slew at the target slewing speed with high accuracy, factoring in the effect of gravity the attachment receives in response to the inclination of the work site and momentum the attachment actually receives in the lateral direction in response to the working radius.

In the configuration above, the slewing control device may further include a load detector configured to detect a load of a hoist cargo suspended from a distal end of the attachment, in which the controller may correct the reference command signal based on at least the load.

According to this configuration, the slewing control device enables the upper slewing body to slew at the target slewing speed with high accuracy, factoring in a load applied by the hoist cargo load to the attachment and the slewing operation of the upper slewing body.

In the configuration above, the variation factor may include an internal variation factor related to the work machine.

According to this configuration, the slewing control device enables the upper slewing body to slew at the target slewing speed with high accuracy even if the internal variation factor causing the slewing speed to vary changes at the work site.

In the configuration above, the internal variation factor may include a factor causing slewing speed of the upper slewing body in a non-connection state to vary, and the non-connection state may be a state in which the attachment is detached from the upper slewing body.

According to this configuration, the slewing control device enables the upper slewing body to which the attachment is attached to slew at the target slewing speed with high accuracy, factoring in a variation factor presented when the upper slewing body without the attachment slews with respect to the lower travelling body.

In the configuration above, the slewing drive unit may include: a slewing motor that receives hydraulic oil and rotates to slew the upper slewing body; and a valve mechanism that opens so as to change a flow rate of the hydraulic oil supplied to the slewing motor in response to the input command signal.

According to this configuration, with the controller optimizing the command signal input to the valve mechanism, the slewing control device is configured to stably set the slewing speed of the upper slewing body at the target slewing speed.

In the configuration above, the controller may receive information about the variation factor and correct the reference command signal through a neural network.

This configuration makes it possible to acquire an optimum command signal after correction, factoring in the effect of each parameter, even under conditions in which a plurality of parameters vary and advanced calculation is necessary.

A work machine according to another aspect of the present invention includes: a lower body; an upper slewing body supported by the lower body so as to be slewable; a slewing drive unit to slew the upper slewing body through driving force according to amplitude of an input command signal; an attachment supported by the upper slewing body so as to be pivotable in a derricking direction; and the above-described slewing control device for a work machine.

According to this configuration, the slewing control device enables the upper slewing body to slew at the target slewing speed with high accuracy while reducing variations caused by the variation factor.

According to the present invention, it is possible to provide a slewing control device for a work machine, the slewing control device enabling an upper slewing body to slew at a target slewing speed with high accuracy, and a work machine including the slewing control device.

The invention claimed is:

1. A slewing control device for a work machine, the slewing control device being used for the work machine including:

a lower body;

an upper slewing body supported by the lower body so as to be slewable;

a slewing drive unit to slew the upper slewing body through driving force according to amplitude of an input command signal; and an attachment supported by the upper slewing body so as to be pivotable in a derricking direction, wherein the slewing control device comprises a controller to enable the slewing drive unit to operate based on feedforward control to slew the upper slewing body at a predetermined target slewing speed, the controller being configured to generate a corrected command signal by correcting a reference command signal set in advance in response to the predetermined target slewing speed, based on information about a variation factor causing slewing speed to vary, the controller being configured to input the corrected command signal to the slewing drive unit.

2. The slewing control device for a work machine according to claim 1, wherein the variation factor includes an external variation factor related to a work site for the work machine.

3. The slewing control device for a work machine according to claim 2, further comprising a wind information acquisition unit configured to acquire wind information including at least one of a volume of a wind and a direction of the wind at the work site, wherein the external variation factor includes the wind information.

4. The slewing control device for a work machine according to claim 3, further comprising a slewing angle detector configured to detect a slewing angle of the upper slewing body with respect to the lower body, wherein the wind information includes the direction of the wind, and the controller corrects the reference command signal based on at least the direction of the wind and the slewing angle.

5. The slewing control device for a work machine according to claim 3, further comprising a working radius acquisition unit configured to acquire information about a working radius of the attachment, wherein the controller corrects the reference command signal based on at least the wind information and the working radius.

6. The slewing control device for a work machine according to claim 2, further comprising an inclination detector configured to detect an angle of inclination of the upper slewing body at the work site with respect to a horizontal plane, wherein the external variation factor includes the angle of the inclination.

7. The slewing control device for a work machine according to claim 6, further comprising a slewing angle detector configured to detect a slewing angle of the upper slewing body with respect to the lower body, wherein the controller corrects the reference command signal based on at least the angle of the inclination and the slewing angle.

8. The slewing control device for a work machine according to claim 6, further comprising a working radius acquisition unit configured to acquire information about a working radius of the attachment, wherein the controller corrects the reference command signal based on at least the angle of the inclination and the working radius.

9. The slewing control device for a work machine according to claim 1, further comprising a load detector configured to detect a load of a hoist cargo suspended from a distal end of the attachment, wherein the controller corrects the reference command signal based on at least the load.

10. The slewing control device for a work machine according to claim 1, wherein the variation factor includes an internal variation factor related to the work machine.

11. The slewing control device for a work machine according to claim 10, wherein the internal variation factor includes a factor causing slewing speed of the upper slewing body in a non-connection state to vary, and the non-connection state is a state in which the attachment is detached from the upper slewing body.

12. The slewing control device for a work machine according to claim 1, wherein the slewing drive unit includes:

a slewing motor that receives hydraulic oil and rotates to slew the upper slewing body; and a valve mechanism that opens so as to change a flow rate of the hydraulic oil supplied to the slewing motor in response to the input command signal.

13. The slewing control device for a work machine according to claim 1, wherein the controller receives information about the variation factor and corrects the reference command signal through a neural network.

14. A work machine comprising:

a lower body;

an upper slewing body supported by the lower body so as to be slewable;

a slewing drive unit to slew the upper slewing body through driving force according to amplitude of an input command signal;

an attachment supported by the upper slewing body so as to be pivotable in a derricking direction; and the slewing control device for a work machine according to claim 1.

15. The slewing control device for a work machine according to claim 7, further comprising a working radius acquisition unit configured to acquire information about a working radius of the attachment, wherein the controller corrects the reference command signal based on at least the angle of the inclination and the working radius.

* * * * *